Jan. 20, 1959  H. E. KLINE ET AL  2,869,652
ROOT CROP HARVESTER
Filed Sept. 19, 1955  2 Sheets-Sheet 1

INVENTORS:
HARRY E. KLINE
STIG O. VIFOT
BY: Emerson B Donnell
ATTORNEY

INVENTORS:
HARRY E. KLINE
STIG O. VIFOT
BY: Emerson B Donnell
ATTORNEY

United States Patent Office 2,869,652
Patented Jan. 20, 1959

2,869,652

ROOT CROP HARVESTER

Harry E. Kline and Stig O. Vifot, Racine, Wis., assignors to J. I. Case Company, Racine, Wis., a corporation of Wisconsin Application September 19, 1955, Serial No. 534,973

4 Claims. (Cl. 171—115)

This invention relates to agricultural harvesters, and, more specifically, it relates to root harvesters for potatoes, beets, and the like.

It is an object of this invention to provide a harvester for potatoes, beets, and like plants, wherein the plant vines and dirt are automatically separated from the potatoes, beets, etc.

Another object of this invention is to provide a harvester for potatoes wherein the potato vines are separated from the potatoes without employing a separate vine topper or cutter to accomplish the separation.

Still a further feature of this invention is to achieve the foregoing objects through a modification of an already existing type of harvester and, therefore, the invention can be readily, easily, and inexpensively employed on existing harvesters.

Still another object of this invention is to provide a harvester for potatoes, beets, or the like, wherein the harvested plants can have their vines separated from their crops and be disposed in windrows located in selected positions with respect to the harvester. This permits harvesting of two rows of plants at one time and laying the harvest of the two rows into one windrow for convenient hand pickup of the potatoes harvested free of their vines.

Other objects and advantages will become apparent upon reading the following description in conjunction with the accompanying drawings, wherein, Fig. 1 is a side perspective view of a preferred embodiment of this invention, with certain parts broken away.

The same reference numerals refer to the same parts throughout the several views.

Figure 1:
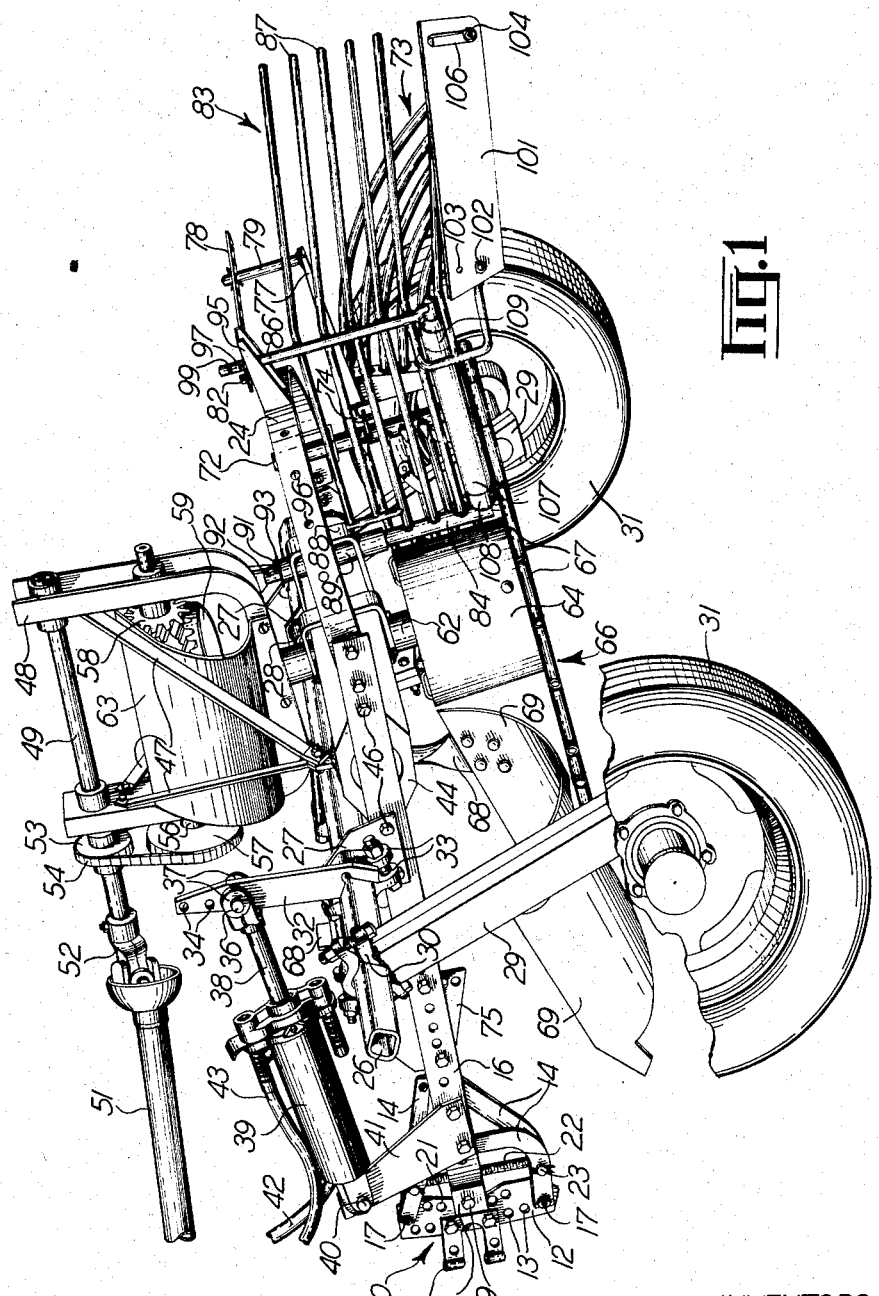

Since this invention is particularly suitable for a root crop or potato harvester, it will be described in connection with such a harvester. Fig. 1 shows a potato harvester of the type which is draft attachable to a tractor (not shown) through an adjustable hitch 10. The latter is composed of a hitch plate 11 which engages the drawbar of a tractor by vertical adjustment to align with the height of the drawbar. The plate 11 is attached to the harvester by bolting to a quadrant plate 12 having a plurality of holes 13 for receiving the bolts in a desired pair of the holes, for certain selective vertical positioning of the hitch plate 11, while mounting arms 14 secure the plate 12 to the frame 16 of the harvester. The arms 14 are vertically pivotally attached to the frame 16 at their rear ends, in any well-known manner, while their front ends attach to the plate 12 by bolts 17. A forward end 18 of the frame 16 is also attached to the plate 12 through a pin 19, but in any one of a plurality of holes 21. An adjusting screw 22 is anchored at its lower end by a bearing 23 between two of the arms 14, and the central portion of the screw 22 threadedly engages the end 18 of the frame to permit adjustment of the vertical position of the frame end 18 with respect to the plate 12 upon removal of the pin 19. Thus, the tilt of the harvester with respect to the tractor can be adjusted by two means of adjustment on the plate 12.

The frame 16 is thus disposed at the angle shown with the forward end lower than the arcuate rearward portion 24. Approximately across the center of the frame 16 is an axle shaft 26 extended beyond the sides of the frame 16 and rotatably mounted thereon through two plates 27 bolted to the frame for supporting the same from the axle. While the axle 26 is shown to be square in cross-section, it is rotatable in the plates 27 as the latter receive the axle in circular bearings 28 such as that partly shown at the far end of the axle. The outer ends of the axle 26 each have an arm 29 clamped thereon by clamps 30 to depend from the axle and attach to a wheel 31 in any suitable manner to, of course, permit the wheels to rotate and support the harvester on the ground. The near wheel 31 is only fragmentarily shown in order that the parts behind it can be shown.

Also attached to the axle 26 is an arm 32 which is attached through clamps 33 to extend upwardly from the axle. The arm 32 is thus rigidly affixed to the axle and it contains a plurality of holes 34 in its upper end for selectively receiving a pin 36 which secures a bifurcated end 37 of a piston rod 38 to the arm 32. Of course, the piston rod 38 is a part of a hydraulic ram 39 which is pivotally attached through a pin 40 to a plate 41 rigidly mounted on the frame 16. The hydraulic ram 39 is of the usual design and the usual hydraulic hoses 42 and 43 are connected at opposite ends of the ram housing for control of fluid pressure within the housing. It should be understood that the opposite unshown ends of the hoses 42 and 43 are connected to the hydraulic power source of the tractor in the usual manner.

With this arrangement, hydraulic pressure is applied in the hose 42 and the rod 38 is extended, as shown. This action maintains the axle 26 in the position shown and the wheels 31 are thus positioned with respect to the frame 16 to support the harvester in the non-operating position which is the transport position since the frame is supported high off the ground. Consequently, if the hydraulic ram 39 is reversed by applying pressure in the hose 43, the piston rod 38 is retracted into the cylinder from the extended shown position. The arm 32 and the axle 28 are thus rotated toward the ram 39 and the wheels 31 are correspondingly rotated toward the frame 16 and the latter, therefore, is lowered from the position shown. The harvester is then in a lowered and operating position which permits it to engage the ground to harvest potatoes with the parts described hereinafter.

Figure 2:
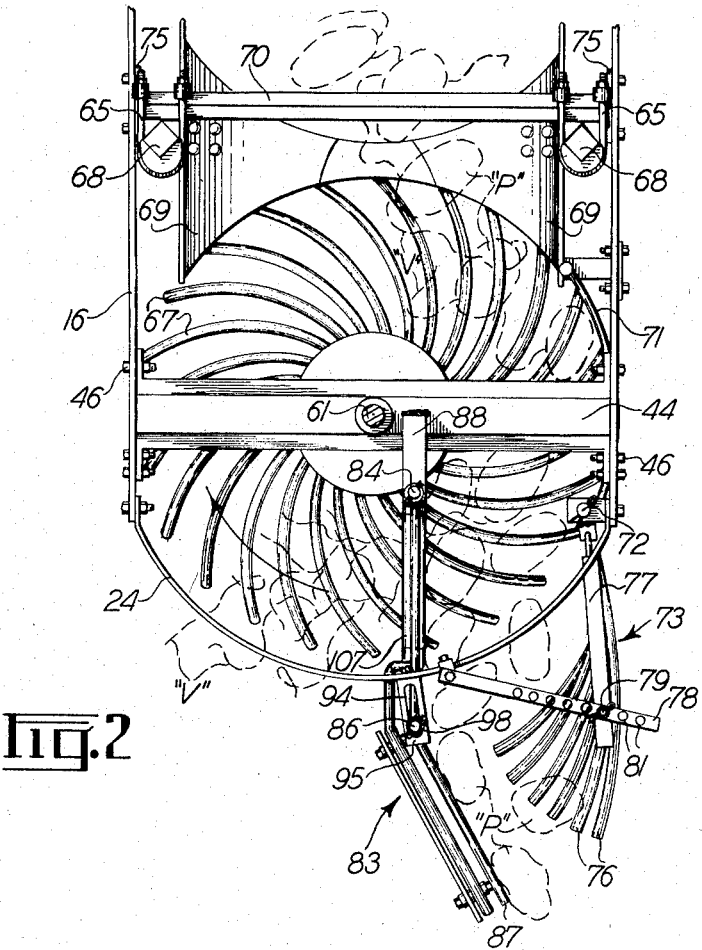
Fig. 2 is a top plan view of certain parts shown in Fig. 1 with potatoes and their vines shown in dotted lines.

A member 44 is horizontally disposed between opposite sides of the frame 16 and attached thereto by bolts 46. A pair of braces 47 are mounted on each end of the member 44 to angle upwardly therefrom to a U-shaped member 48 and support the latter on the member 44. A shaft 49 is mounted between the upper ends of the member 48 and it extends forward of the member to couple with a drive shaft 51 through a universal joint 52. In the usual manner, the shaft 51 extends to the tractor and is driven thereby to, of course, rotate the shaft 49. A sprocket 53 and chain 54 are engaged with the shaft 49 to transmit the rotation of the shaft 49 to a jack shaft 56 rotatably mounted on the member 48 to also extend forward thereof to support a sprocket 57 which is engaged in driven relation with the chain 54. Thus, the shaft 56 is rotated and a bevel gear 58 on the shaft 56 is likewise rotated while it meshes with a second bevel gear 59. The latter is keyed to a rotatable spinner shaft 61, shown in Figs. 2 and 3, which is disposed within a vertical shaft housing 62 to extend between a gear housing 63 and a lower housing 64. The usual plurality of tines 67 are attached to the lower end of the shaft 61 to rotate therewith and the direction of rotation is as shown in Fig. 2. The tines 67, with a curvature as shown in Fig. 2, form a potato supporting surface, and the tines and shaft constitute a spinner 66.

Figure 3:
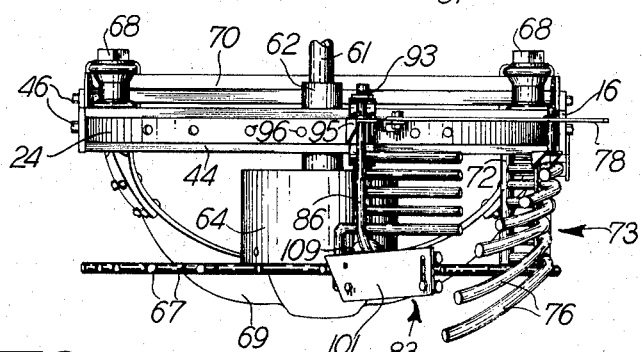
Fig. 3 is a rear elevation view of that shown in Fig. 2.

Also suitably attached to the frame 16, in any well-known manner, is a pair of tool standards 68 depending from a tool bar 70 attached to the frame to be horizontally disposed and to support a pair of shovel portions 69. As shown, the standards 68 are secured to the bar 70 through U-bolts 65 while the bar 70 is attached to the frame 16 by welding to plates 75 which are bolted to the frame. The shovels are spaced apart sufficiently to align with two rows of potatoes and they are inclined upwardly to the rear with the rear edge thereof overlapping the adjacent front circumference of the spinner 66. With this conventional construction, the shovels 69 are positioned under the ground at the front ends when the harvester is lowered into the operating position as explained above. The shovels thus dig up the potatoes as the harvester is moved forward, and the potatoes "P" with their vines "V" and any lumps of dirt dug up are all deposited onto the tines 67 of the rotating spinner 66. To guide the material picked up and deposited on the spinner, a right hand substantially vertical fence or guide 71 is attached to the frame 16 to be disposed around a part of the spinner, as best shown in Figs. 2 and 3. The rear end of the fence 71 terminates at an upright post 72 secured to the frame 16 for supporting the horizontal fence rods which are attached to the post. Also attached to the post 72 is a right hand windrow gate 73 which is pivotal about a hook 74 forming a part of the gate 73 and engaged with the post 72. As shown, a plurality of bars 76 are also part of the gate 73 and they extend toward the center line of the harvester and downwardly to guide the potatoes as they leave the spinner 66 and fall onto the ground. The gate 73 is adjustably pivotal, as mentioned, and an arm 77 is attached to the gate to connect to a strap 78 through a rod 79 to permit the rod to be secured in one of a plurality of holes 81 in the strap 78 as the gate 73 is pivoted to a selected position. The strap 78 is pivoted to the frame 16 at the bolt 82 to receive and maintain the rod 79. Thus, when the shovels dig two rows of potatoes at one time, the gate 73 can guide the potatoes into one windrow.

The foregoing describes a substantially conventional potato and beet harvester and no further description is thus deemed necessary.

An important feature of this harvester is the provision of a left hand windrow gate or guide 83 mounted on the frame 16 to be disposed substantially longitudinally of the harvester when in the position shown. The gate 83 consists of a front upright post 84 and a rear upright post 86 with a plurality of cross bars 87 suitably attached to the posts and extended rearwardly beyond the rear post 86, as shown. The front post 84 is mounted on the cross-member 44 through a U-shaped bracket 88 which is shown welded to the member 44. A bearing sleeve 89 is received in openings in the legs of the bracket 88 and the sleeve is suitably fixed to the bracket. The post 84 is then disposed within the sleeve 89 to be axially movable therewithin while a removable pin 91 is engaged in one of a plurality of holes 92 in the upper end of the post 84. A stop collar 93 is disposed between the pin 91 and the sleeve 89 to prevent the post 84 from falling through the sleeve. The rear post 86 is similarly mounted on the frame 16 by projecting through a slot 94 in a bracket 95 bolted to the frame rear piece 24. Again a stop pin 97 and a stop collar 98 are engaged in one of a plurality of holes 99 in the upper end of the post 86 to secure the post from falling through the bracket.

With this arrangement, the gate 83 is free to move up and down with respect to the frame 16 and the downward movement of the gate is limited by the pins and stop collars. Further, the downward movement is adjustable by positioning the pins 91 and 97 in selected holes 92 and 99 in the respective posts. Also, the gate 83 can be adjusted to assume a selected angular position by mounting the bracket 95 in a selected one of the holes 96 in the piece 24. Thus, the gate can be pivoted about the front post 84 to assume any angular position within the limits of the piece 24 as seen in Fig. 2. Since the gate 83 serves to intercept the potatoes from the spinner 66 and direct them to the ground, the angular adjustment of the gate permits control of the formation of the windrows. It should be noted that the post 84 of the gate 83 is not necessarily centered with respect to the curvature of the piece 24 but the slot 94 in the bracket 95 accommodates any eccentricity of the post 84 with respect to the piece 24 as the post 86 is thus radially movable in the slot 94.

A further element employed in guiding the potatoes on the ground is a plate 101 attached to the lower one of the bars 87 of the gate 83 to be offset from the gate as shown in Fig. 2. The plate 101 is attached by a bolt 102 engaged with the front end of the plate through one of two holes 103 in the plate. A bolt 104 is engaged with the rear of the plate through a vertical slot 106 in the plate. Thus, the plate is vertically adjustable with respect to the gate 83 from the upper position shown to a lower position achieved by loosening the bolts and moving the plate down. The plate 101 is then available for engaging the potatoes which fall from the tines 87 and to the left hand side of the windrow. The plate then engages those potatoes on the ground to slide them into alignment of the windrow.

Also attached to the lower end of the gate 83 is a roller 107 which is rotatably mounted between bearings 108 and 109 suitably attached to the lower ends of the posts 84 and 86, respectively. The roller 107 is thus disposed above the tines 67 of the spinner 66 to be in slight contact with the tines by adjustment of the setting of the pins at the tops of the posts. It should be noted that the roller and the spinner are disposed parallel to each other with the spinner slightly oblique to the frame 16, and the piece 24 supporting the gate 83 at a slight angle with respect to the frame 16.

With the foregoing described structure, the gate 83 is dropped down to where the roller 107 engages the tines 67 and is rotated by the rotation of the spinner 66. The potatoes, vines, and dirt shoveled onto the spinner are carried around to the opening between the gates 73 and 83 except for that which drops between the tines. Fig. 2 shows the path of the potatoes and vines by showing them in dotted lines. The vines are capable of falling between the tines to be carried to the roller 107, as indicated, and the roller continues to rotate as the vines pass under it. The weight of the gate 83 keeps the roller down, except for the amount the roller is raised by the vines, and the potatoes cannot pass under the roller. Continued rotation of the spinner causes the vines to be pulled off the potatoes as the latter pass on to the ground behind the harvester. The vines fall off the spinner on the left side of the gate 83, as indicated. Lumps of dirt are also engaged by the roller 107 and are crushed thereby to fall between the tines 67 rather than pass off the spinner with the potatoes.

It will be noted that the spinner 66 is at a slight angle to the ground so that the potatoes must move upwardly on the inclined spinner to pass over it. Adjustment of the frame 16 at its forward end 18 on the plate 12 will alter the angle of the spinner 66. Thus, the screw 22 can be used to raise or lower the forward end of the harvester, and, if it is lowered, the incline of the spinner will be increased and the potatoes will remain on the spinner a longer time and be swept by more tines and thus be cleaned more. However, the potatoes, if the angle is too great, can also be scrubbed too much by the spinner and bruised in the action, so, in order to avoid this, the best angle can be selected as described. Also, the depth of penetration of the shovels into the ground can be controlled by the hydraulic ram 39 through both its length of stroke and the point of connection of the piston rod 38 in one of the holes 34 of the torque arm 32. Of course, the greater the amount of rotation of the axle 26 caused by a greater length of stroke of the rod 38 or a selected connection with the arm 32, the higher the harvester frame will be.

While a specific embodiment of this invention has been shown and described, it should be obvious that certain changes therein could be made without departing from the scope of this invention which should, therefore, be limited only by the scope of the appended claims.

We claim:

1. In a potato crop harvester of the type mobile on the ground along a row of planted potatoes, the combination of a mobile harvester frame, a shovel attached to said frame and depending therefrom, a spinner rotatably mounted on said frame and including a plurality of spaced apart tines disposed in a plane slightly inclined upwardly to the rear with respect to the direction of harvester movement and disposed to extend immediately behind said shovel for receiving potatoes and their vines therefrom, and a roller mounted on said harvester with the axis thereof disposed substantially radial to the axis of rotation of said spinner and parallel to the plane of rotation of said tines to said roller being in rolling contact with the latter.

2. A potato crop harvester comprising in combination a frame, a set of wheels attached to said frame and supporting the latter for mobility on the ground, a shovel attached to said frame and depending therefrom at the forward end of said frame with respect to the operating direction of movement of said harvester, with said shovel dependent for engagement with the ground to dig potatoes and their vines from the ground upon advancing of said harvester, a spinner rotatably centrally mounted on said frame and including a potato supporting surface disposed immediately behind said shovel for receiving said potatoes and their vines from said shovel, and a roller rotatably mounted on said frame, disposed in rolling contact on said potato supporting surface of said spinner for intercepting potatoes on said supporting surface and for engaging the vines of said potatoes between said supporting surface and said roller to separate the vines from said potatoes upon rotation of said spinner.

3. In a potato crop harvester of the type being mobile on the ground along a row of potatoes and having a frame supporting a rotatable spinner with a ground engaging shovel on said frame and disposed forwardly of said spinner with respect to the direction of operating movement of said harvester for digging potatoes and their vines from the ground and depositing them on said spinner, the combination of a roller rotatably mounted on said frame and disposed on said spinner at the side thereof opposite from said shovel and in rolling contact with said spinner in position for rolling over said vines to hold the same in cooperation with said spinner for removing said vines from said potatoes, said roller being mounted on said frame and freely vertically movable with respect to said spinner in response to the quantity of said vines between said spinner and said roller.

4. A potato crop harvester comprising in combination a frame, a set of wheels attached to said frame to support the latter above the ground, a shovel attached to said frame in a position depending therefrom for engagement with the ground to dig potatoes and their vines from the ground upon advancing of said harvester along the ground, a spinner rotatably mounted on said frame and including a plurality of spaced apart tines disposed for receiving said potatoes and their vines from said shovel, a roller rotatably mounted on said frame and disposed on said tines with the axis of rotation of said roller disposed transverse to the direction of rotation of said spinner and said roller being movable in a direction substantially parallel to the axis of rotation of said tines.

References Cited in the file of this patent
UNITED STATES PATENTS

| | | |
|---|---|---|
| 2,468,639 | Sample | Apr. 26, 1949 |

FOREIGN PATENTS

| | | |
|---|---|---|
| 316,990 | Great Britain | Aug. 6, 1929 |
| 703,243 | Great Britain | Feb. 3, 1954 |
| 716,568 | Great Britain | Oct. 6, 1954 |